United States Patent
Van Cleve

(10) Patent No.: US 7,845,241 B2
(45) Date of Patent: Dec. 7, 2010

(54) BALANCING STRUCTURE FOR A SINGLE CURVED TUBE CORIOLIS FLOW METER

(75) Inventor: Craig Brainerd Van Cleve, Lyons, CO (US)

(73) Assignee: Micro Motion, Inc., Boulder, CO (US)

(*) Notice: Subject to any disclaimer, the term of this patent is extended or adjusted under 35 U.S.C. 154(b) by 129 days.

(21) Appl. No.: 12/297,547

(22) PCT Filed: May 1, 2006

(86) PCT No.: PCT/US2006/016544

§ 371 (c)(1),
(2), (4) Date: Oct. 17, 2008

(87) PCT Pub. No.: WO2007/130024

PCT Pub. Date: Nov. 15, 2007

(65) Prior Publication Data

US 2009/0249891 A1    Oct. 8, 2009

(51) Int. Cl.
*G01F 1/84*   (2006.01)

(52) U.S. Cl. .................................. 73/861.355

(58) Field of Classification Search .............. None
See application file for complete search history.

(56) References Cited

U.S. PATENT DOCUMENTS

| | | | |
|---|---|---|---|
| 5,663,509 A | 9/1997 | Lew et al. | |
| 5,705,754 A | 1/1998 | Keita et al. | |
| 6,223,605 B1 | 5/2001 | Koudal et al. | |
| 6,301,974 B1 * | 10/2001 | van der Pol et al. | 73/861.357 |
| 6,401,548 B1 | 6/2002 | Drahm et al. | |
| 6,484,591 B2 | 11/2002 | Drahm et al. | |
| 6,666,098 B2 | 12/2003 | Drahm et al. | |
| 6,807,866 B2 | 10/2004 | Drahm et al. | |
| 6,851,323 B2 | 2/2005 | Rieder et al. | |
| 7,694,585 B2 * | 4/2010 | Nakao | 73/861.357 |

* cited by examiner

*Primary Examiner*—Harshad Patel
(74) *Attorney, Agent, or Firm*—The Ollila Law Group LLC

(57) ABSTRACT

A Coriolis flow meter is disclosed that uses the deflection of a torsion member (430) to balance the vibration of a single curved flow tube (308). The two ends of the torsion member are attached to, and vibrate with, a center section of the single flow tube (308). A balance member (432) is attached to a center section of the torsion member (430) and vibrates in the opposite phase of the single flow tube (308) causing the torsion member (430) to be deflected in torsion.

31 Claims, 9 Drawing Sheets

BALANCING STRUCTURE FOR A SINGLE CURVED TUBE CORIOLIS FLOW METER

BACKGROUND OF THE INVENTION

1. Field of the Invention

The invention is related to the field of flow meters, and in particular, to Coriolis flow meters.

2. Description of the Prior Art

Coriolis flow meters typically operate by vibrating one or more flow tubes and measuring deflections, or phase differences, in the vibrating flow tubes induced by the Coriolis forces from a material flowing through the flow tubes. Coriolis flow meters have a number of different flow tube designs. Some meters have straight flow tubes and some have curved flow tubes. Some meters have a single flow tube and some have two flow tubes. Each type of Coriolis flow meter has been developed to address different problems in the operation of the flow meter. One of the problems addressed has been the vibration of the flow meter at the connecting point to the piping system. Typically the flow meter will have a flange at each end of the meter to allow the meter to be coupled into the piping system.

Dual tube designs typically split the flow of material into two streams using manifolds and send the two streams of material into the two flow tubes. Because the flow is split into two streams, the diameter of the flow tubes need not be the same as the diameter of the piping system. The two tubes are typically symmetrical in shape and mounted parallel to one-another. The two tubes typically vibrate at the same frequency but in the opposite phase. Because the tubes are symmetrical and vibrated opposite each other, the vibrations typically cancel out where the two tubes are joined. This creates a balanced flow meter (i.e. little or no vibration of the meter at the manifolds). A change in density in the material flowing through the two tubes changes the mass of both tubes equally and therefore the two tube designs remain balanced across a wide range of material densities. The two tubes are typically joined together at the manifolds. Splitting a wide range of different materials into two equal flows is a difficult task for a dual tube design. Splitting the flow can also create a greater pressure drop across the flow meter. In addition, material can become clogged at the split point inside the manifold.

Single tube designs don't split the flow into two streams. This eliminates the problems associated with splitting the flow into two equal streams. Because there is only a single vibrating tube, another method must be used to eliminate the vibration of the flow meter at the flanges. Straight single tube designs may use a counterbalance member surrounding at least a portion of the vibrating flow tube. One such meter is disclosed in U.S. Pat. No. 6,401,548 "Coriolis mass flow/density sensor". Curved single flow tube designs have used a number of techniques to eliminate the vibration of the meter at the manifolds. One technique is to include a support plate having a mass substantially higher than the mass of the vibrating tube, for example U.S. Pat. No. 5,705,754 "Coriolis-Type mass flowmeter with a single measuring tube". Another technique is to have two tubes parallel to each other, but only flow material through one of the tubes. The second "dummy" tube is used as the counter balance and vibrates in opposite phase with the measuring tube. An example of this technique is show in U.S. Pat. No. 6,666,098 "Vibratory transducer". Another technique is to build a structure attached to the single tube that has a member that vibrates in the opposite phase of the vibrating tube, for example U.S. Pat. No. 6,484,591 "Mass flow rate/density sensor with a single curved measuring tube". These methods may create a balanced meter for a single material at a given density. Unfortunately, when the density of the material changes or a different material with a different density is measured, the flow meter is typically no longer in balance.

Therefore there is a need for a system and method for balancing a single curved tube Coriolis flow meter over a range of material densities.

SUMMARY OF THE INVENTION

A Coriolis flow meter is disclosed that uses the deflection of a torsion member to balance the vibration of a single curved flow tube. The two ends of the torsion member are attached to, and vibrate with, a center section of the single flow tube. A balance member is attached to a center section of the torsion member and vibrates in the opposite phase of the single flow tube causing the torsion member to be deflected in torsion.

Aspects

One aspect of the invention includes a Coriolis flow meter, comprising:
  a single flow tube comprising;
    an inlet section and an outlet section where the inlet section and outlet sections are axially aligned;
    a first bent section attached to the inlet section and a second bent section attached to the outlet section;
    a connecting section extending between the first bent section and the second bent section where a center of the connecting section defines an axis of symmetry of the single flow tube and where the single flow tube is symmetrical about the axis of symmetry and where the single flow tube is formed essentially in one plane;
  a torsion member having a first end and a second end where the first end is attached to the connecting section of the single flow tube near the first bent section and the second end is attached to the connecting section of the single flow tube near the second bent section;
  a balance member attached to the torsion member and extending towards the center of the connecting section of the single flow tube and where the balance member is generally perpendicular to the torsion member;
  at least one drive bracket attached to the balance member where the at least one drive bracket is configured to mount a drive device where the drive device is configured to apply a force against the single flow tube;
  the torsion member having a center section and where the first end and the second end of the torsion member is configured to vibrate in-phase with the single flow tube and the center section is configured to vibrate in the opposite phase with respect to the single flow tube thereby causing the torsion member to deform in torsion along a torsional vibration axis.

Preferably, a first manifold coupled to the inlet section of the single flow tube and a second manifold coupled to the outlet section of the single flow tube;
  a manifold spacer extending between the first and second manifold, the manifold spacer having an outer surface, the manifold spacer having a first opening through the outer surface near the first manifold and a second opening through the outer surface near the second manifold where a first end of the connecting section of the single flow tube extends through the first opening and a second end of the connecting section of the single flow tube extends through the second opening;
  a flexible member aligned with the torsional vibration axis and coupled to the outer surface of the manifold spacer and coupled to the second surface of the center section of the torsion member.

Preferably, the manifold spacer encloses the inlet section and the outlet section of the single flow tube and the first bent section and the second bent section of the single flow tube.

Preferably, the manifold spacer is essentially cylindrical.

Preferably, the torsional vibration axis is in the plane defined by the single flow tube.

Preferably, a pickoff support member attached to the balance member where the pickoff support member is parallel with the torsion member and extends between two segments of the connecting section of the single flow tube on opposite sides of the axis of symmetry of the single flow tube and where the pickoff support member is configured to hold a first sensor device at a first end of the pickoff support member and a second sensor device at a second end of the pickoff support member.

Preferably, a dongle attached to the torsion member where the dongle is perpendicular to the torsion member and extends downward from the torsion member, away from the single flow tube, and is aligned with the axis of symmetry of the single flow tube and where the dongle is configured to eliminate any residual motion in the first and second manifolds.

Preferably, the dongle is a flat plate with a generally rectangular shape with a long axis of the rectangular shape perpendicular to the torsion member.

Preferably, the torsion member is a generally flat plate parallel to the torsional vibration axis and where the first end of the torsion member is bent such that the first end is perpendicular to the connecting section of the single flow tube where the first end of the torsion member is coupled to the connecting section of the single flow tube and the second end of the torsion member is bent such that the second end is perpendicular to the connecting section of the single flow tube where the second end of the torsion member is coupled to the connecting section of the single flow tube.

Preferably, the connecting section of the single flow tube further comprises:

a first straight section attached to the first bent section and a second straight section attached to the second bent section of the single flow tube;

a curved vertex section attached to, and extending between, the first straight section and the second straight section.

Preferably, the balance member of the single flow tube is a generally flat plate having a trapezoidal shape with the wide end of the trapezoid attached to the torsion member along the torsional vibration axis.

Preferably, the balance member is configured to have a high bending stiffness along the axis of symmetry of the single flow tube.

Preferably, a stiffness of the flow tube and a stiffness of the torsion member and balance member are adjusted such that the natural frequency of the out-of-phase vibration of the flow tube and torsion member and balance member is much higher than the in-phase natural frequency.

Another aspect of the invention comprises a method of balancing a Coriolis flow meter having a single curved flow tube, comprising:

suspending the single curved flow tube between two ends of the Coriolis flow meter where two bent sections of the single curved flow tube are unsupported and where the two bent section are on opposite sides of an axis of symmetry of the single curved flow tube;

attaching two ends of a torsion member to the single curved flow tube at two points placed symmetrically about the axis of symmetry of the single curved flow tube and closer to the axis of symmetry than the two bent sections of the single curved flow tube;

generating a force between the single curved flow tube and a counterbalance structure such that the counterbalance structure and the single curved flow tube vibrate at the same frequency but in the opposite phase and where the counterbalance structure is attached to a center section of the torsion member whereby the center section of the torsion member deflects in torsion, along a torsional axis of rotation, in-phase with the balance structure and the two ends of the torsion member deflect in torsion, along the torsional axis of rotation, in-phase with the single curved flow tube.

Preferably, the method further comprises the torsion member is attached to a manifold spacer with a flexible member and where the flexible member is aligned to the torsional axis of rotation.

Preferably, the method further comprises a dongle is attached to the torsion member opposite the counterbalance structure and configured to eliminate any residual motion in the two manifolds.

Another aspect of the invention comprises a method of balancing a Coriolis flow meter having a single curved flow tube, comprising:

vibrating the single curved flow tube;

flowing a material having a first density through the vibrating single curved flow tube;

deflecting in torsion a torsion member where a first end and a second end of the torsion member deflect in-phase with the vibration of the single curved flow tube and where a center section of the torsion member deflects in torsion in the opposite phase of the vibration of the single curved flow tube and where a first vibration axis is formed at a first location between the first end and the center section of the torsion member and a second vibration axis is formed at a second location between the second end and the center section of the torsion member.

Preferably, the method further comprises flowing a material having a second density through the single curved flow tube where the first density is different than the second density and where the first vibration axis is no longer formed at the first location and the second vibration axis is no longer formed at the second location.

Another aspect of the invention comprises a method of manufacturing a Coriolis flow, comprising:

providing a single flow tube, the single flow tube comprising;

an inlet section and an outlet section where the inlet section and outlet sections are axially aligned;

a first bent section attached to the inlet section and a second bent section attached to the outlet section;

a connecting section extending between the first bent section and the second bent section where a center of the connecting section defines a axis of symmetry of the single flow tube and where the single flow tube is symmetrical about the axis of symmetry and where the single flow tube is formed essentially in one plane;

attaching a first end of a torsion member to the connecting section of the single flow tube near the first bent section and attaching a second end of the torsion member to the connecting section of the single flow tube near the second bent section;

attaching a balance member to the first side of the torsion member where the balance member extends towards the center of the connecting section of the single flow tube and where the balance member is oriented in the plain of the flow tube;

attaching at least one drive bracket to the balance member where the at least one drive bracket is configured to mount a drive device where the drive device is configured to apply a force against the single flow tube;

the torsion member having a center section and where the first end and the second end of the torsion member are configured to vibrate in-phase with the single flow tube and the center section is configured to vibrate in the opposite phase with respect to the single flow tube thereby causing the torsion member to deform in torsion along a torsional vibration axis.

Preferably, the method further comprises coupling a first manifold to the inlet section of the single flow tube and a second manifold to the outlet section of the single flow tube;

attaching a manifold spacer between the first and second manifolds, the manifold spacer having an outer surface, the manifold spacer having a first opening through the outer surface near the first manifold and a second opening through the outer surface near the second manifold where a first end of the connecting section of the single flow tube extends through the first opening and a second end of the connecting section of the single flow tube extends through the second opening;

attaching a flexible member to the outer surface of the manifold spacer and to the torsion member where the flexible member is aligned with the torsional vibration axis.

Preferably, the method further comprises the manifold spacer encloses the inlet section and the outlet section of the single flow tube and the first bent section and the second bent section of the single flow tube.

Preferably, the method further comprises the manifold spacer is essentially cylindrical.

Preferably, the method further comprises the torsional vibration axis runs between the connecting section of the single flow tube near the first bent section and the connecting section of the single flow tube near the second bent section along a length of the center section of the torsion member.

Preferably, the method further comprises attaching a pickoff support member to the balance member where the pickoff support member is parallel with the torsion member and extends between two segments of the connecting section of the single flow tube on opposite sides of the axis of symmetry of the single flow tube and where the pickoff support member is configured to hold a first sensor device at a first end of the pickoff support member and a second sensor device at a second end of the pickoff support member.

Preferably, the method further comprises attaching a dongle to the torsion member where the dongle is perpendicular to the torsion member and extends downward from the torsion member, away from the balance member, and is aligned in the plane of the single flow tube and where the dongle is configured to eliminate any residual motion in the first and second manifolds.

Preferably, the method further comprises the dongle is a flat plate with a generally rectangular shape with a long axis of the rectangular shape perpendicular to the torsion member.

Preferably, the method further comprises the torsion member is a generally flat plate parallel to the torsional vibration axis and where the first end of the torsion member is bent such that the first end is perpendicular to the connecting section of the single flow tube where the first end of the torsion member is coupled to the connecting section of the single flow tube and the second end of the torsion member is bent such that the second end is perpendicular to the connecting section of the single flow tube where the second end of the torsion member is coupled to the connecting section of the single flow tube.

Preferably, the method further comprises the connecting section of the single flow tube further comprises:

a first straight section attached to the first bent section and a second straight section attached to the second bent section of the single flow tube;

a curved vertex section attached to, and extending between, the first straight section and the second straight section.

Preferably, the method further comprises the balance member of the single flow tube is a generally flat plate having a trapezoidal shape with the wide end of the trapezoid attached to the torsion member along the torsional vibration axis.

Preferably, the method further comprises the balance member is configured to have a high bending stiffness along the axis of symmetry of the single flow tube.

Preferably, the method further comprises a stiffness of the flow tube and a stiffness of the torsion member and balance member are adjusted such that the natural frequency of the out-of-phase vibration of the tube and torsion member and balance member is much higher than the in-phase natural frequency.

DETAILED DESCRIPTION OF THE PREFERRED EMBODIMENT

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
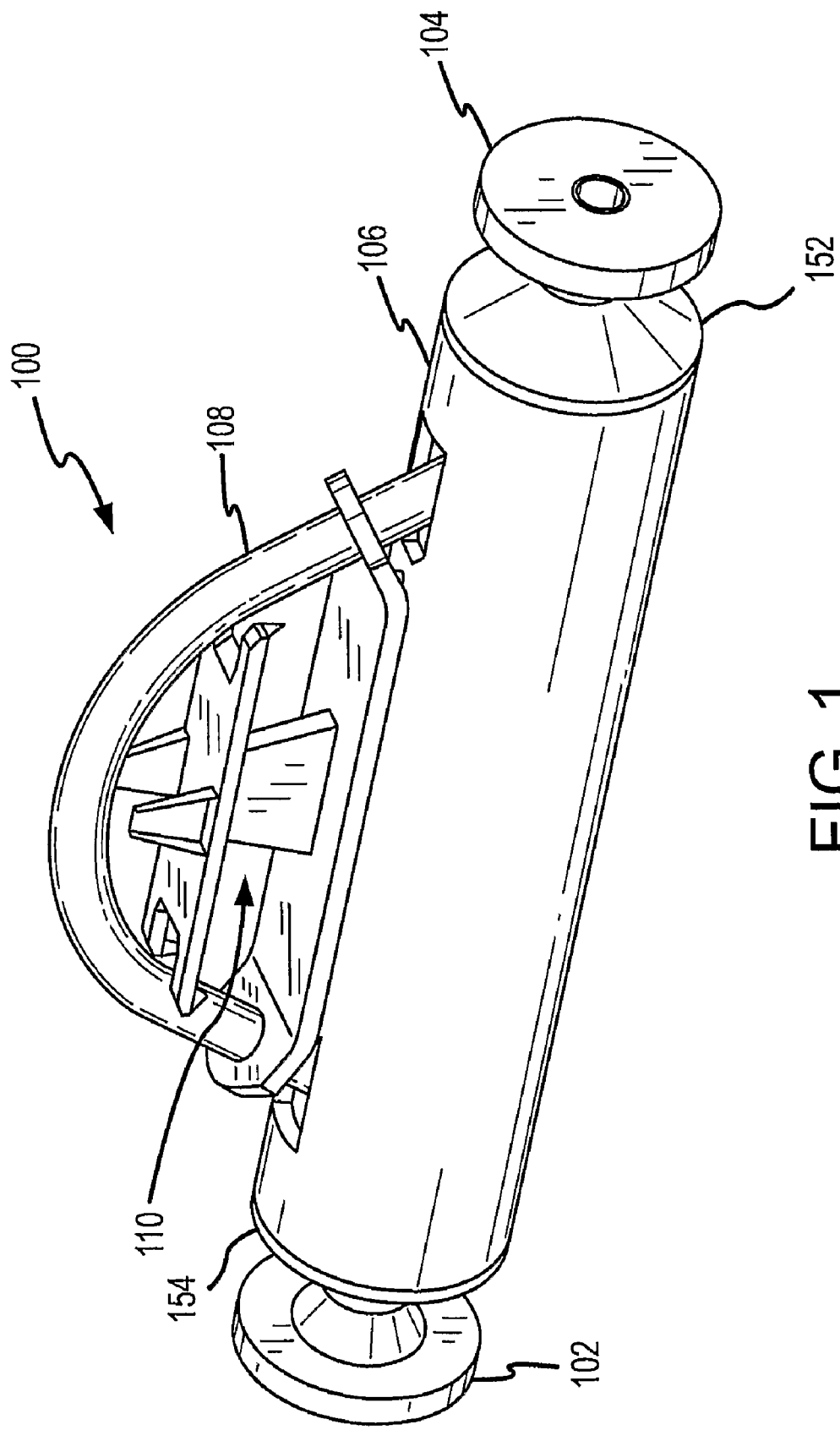
FIG. 1 is an isometric view of Coriolis flow meter 100 with the case removed in an example embodiment of the current invention.
Figure 2:
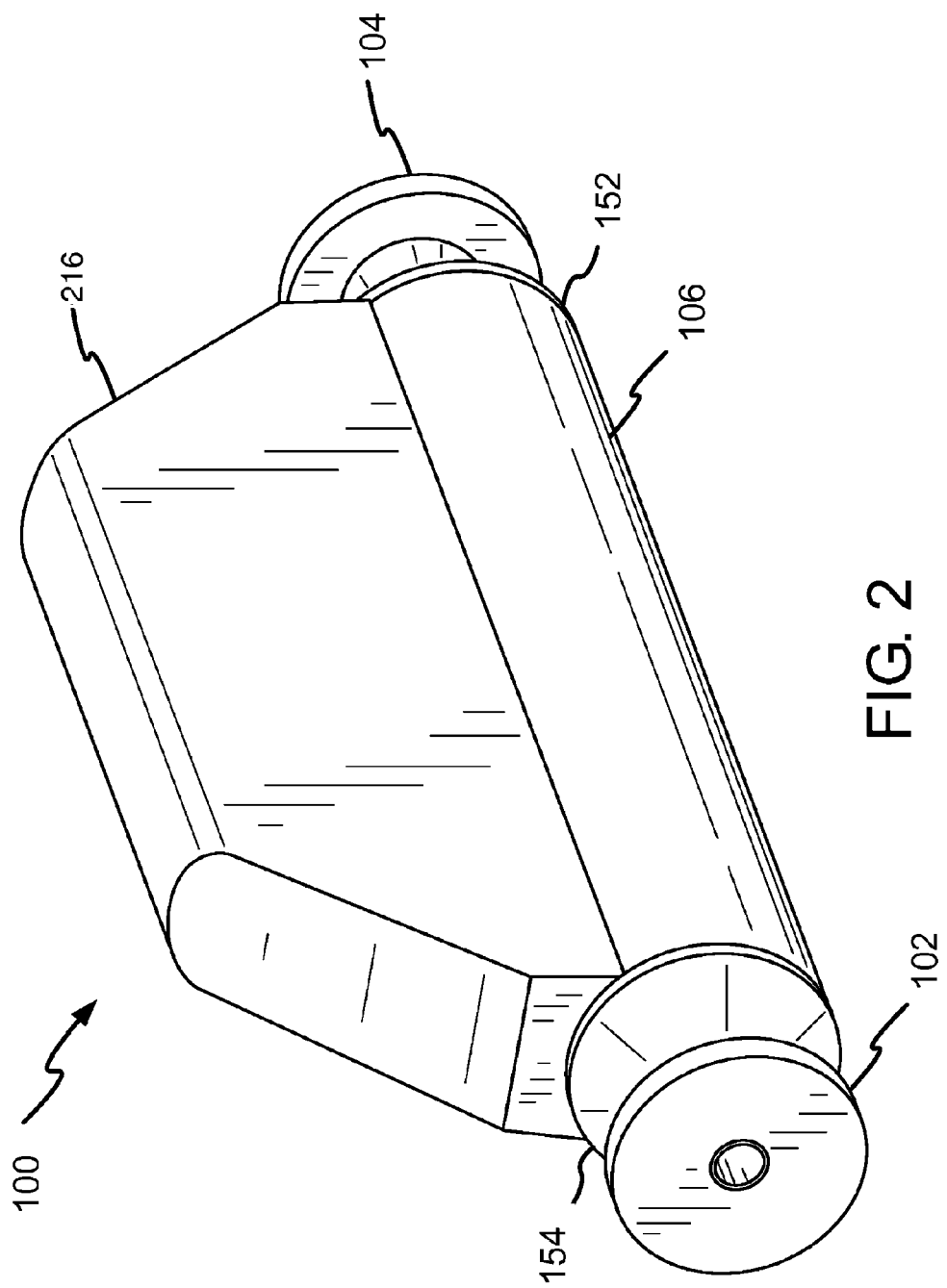
FIG. 2 is an isometric view of Coriolis flow meter 200 with its case in an example embodiment of the invention.

FIG. 1 is an isometric view of Coriolis flow meter 100 in an example embodiment of the current invention. Coriolis flow meter 100 comprises an inlet flange 102, an outlet flange 104, an inlet manifold 154, an outlet manifold 152, a manifold spacer 106, a single curved flow tube 108 and a balancing structure 110. The inlet and outlet flanges (102 and 104) are used to couple the Coriolis flow meter 100 into a piping system (not shown). The inlet and outlet flanges (102 and 104) typically have bolt holes but are shown without the bolt hole for simplicity. The inlet and outlet manifolds (152 and 154) are fastened at either end of manifold spacer 104. Manifold spacer 104 is typically cylindrical, but may also be formed with other cross sections, for example a rectangular cross section. Each end of single flow tube 108 fits into openings in the inlet and outlet manifolds (152 and 154). A soft connection (not shown) may be used to join the ends of the single curved flow tube 108 to the two manifolds (152 and 154). A curved section of the single flow tube 108 extends above the outer surface of manifold spacer 106 through an opening in each end of manifold spacer 106. Balance structure 110 attaches to the single flow tube 108 at two connecting points. The two connecting points are located near either end of single flow tube 108 near where the single flow tube 108 extends outside of manifold spacer 106. The balance structure 110 is suspended between the two connecting points on the single flow tube 108 and is positioned between the single flow tube 108 and the manifold spacer 106. In operation, a protective covering would be attached to the manifold spacer and shield the single curved flow tube and balancing structure from damage. FIG. 2 is an isometric view of Coriolis flow meter 100 in an example embodiment of the invention. Coriolis flow meter 100 comprises inlet flange 102, outlet flange 104, inlet manifold 154, outlet manifold 152, manifold spacer 106, and case 216.

Figure 3:
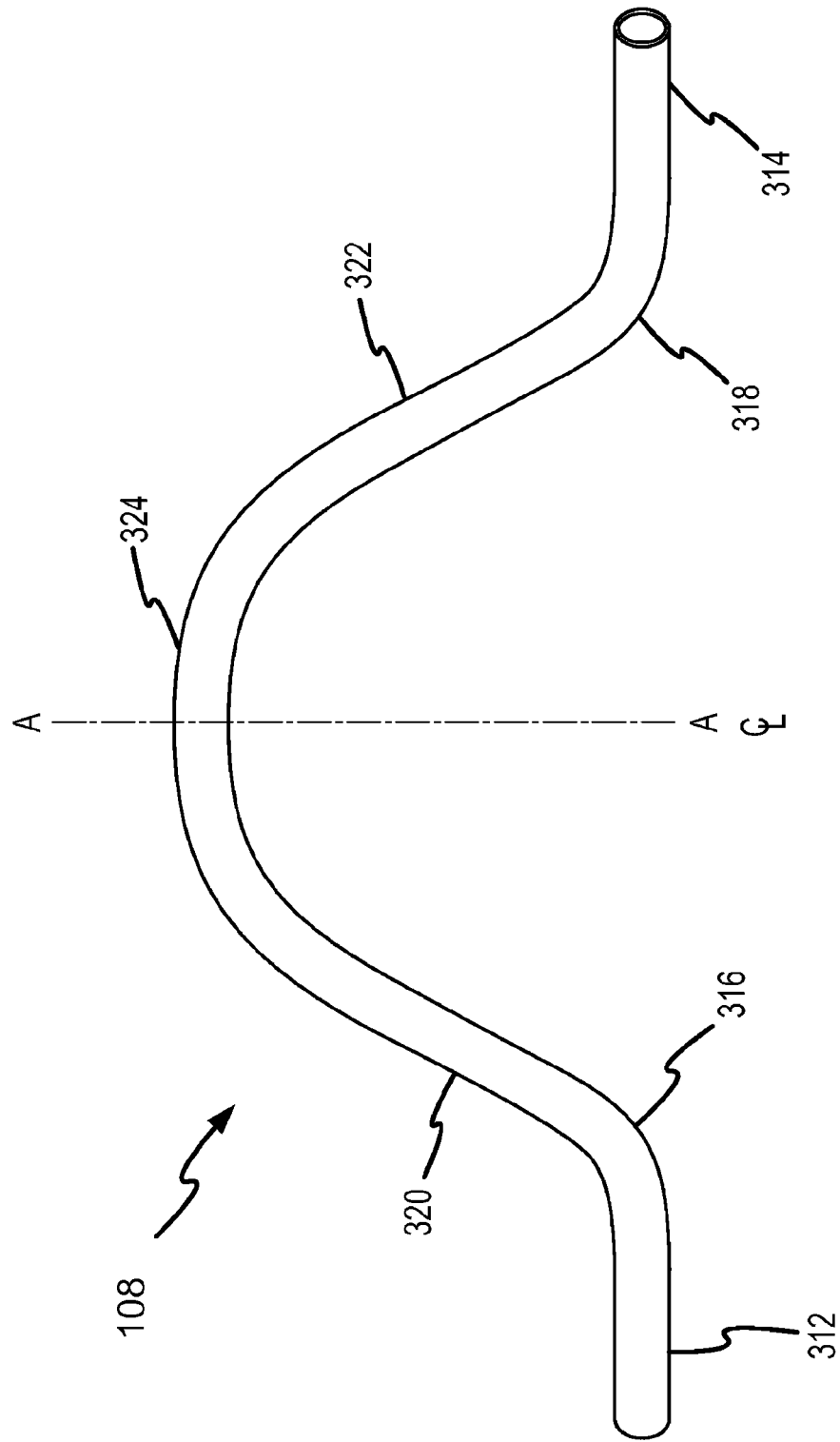
FIG. 3 is an isometric view of a single curved flow tube 308 in an example embodiment of the invention.

FIG. 3 is an isometric view of a single curved flow tube 108 in an example embodiment of the invention. Single curved flow tube 108 is comprised of an inlet section 312, an outlet section 314, a first bent section 316, a second bent section 318, a first straight section 320, a second straight section 322, and a curved vertex section 324. Inlet section 312 and outlet section 314 are axially aligned and join an inlet and outlet manifold (not shown) respectively. First bent section 316 is coupled to inlet section 312. Second bent section 318 is coupled to outlet section 314. First straight section 320 is coupled to first bent section 316. Second straight section 322 is coupled to second bent section 318. Curved vertex section 324 is coupled to first and second straight sections (320 and 322). Curved vertex section 324 may take the shape of a circle segment or may take other curved shapes. In one example embodiment of the invention (not shown), curved vertex section would couple directly to the first and second bent sections (316 and 318) thereby eliminating the two straight sections (320 and 322). The single curved flow tube is formed in essentially one plane. The single curved flow tube is symmetrical about axis AA, therefore axis AA forms an axis of symmetry for the single flow tube.

Figure 4:
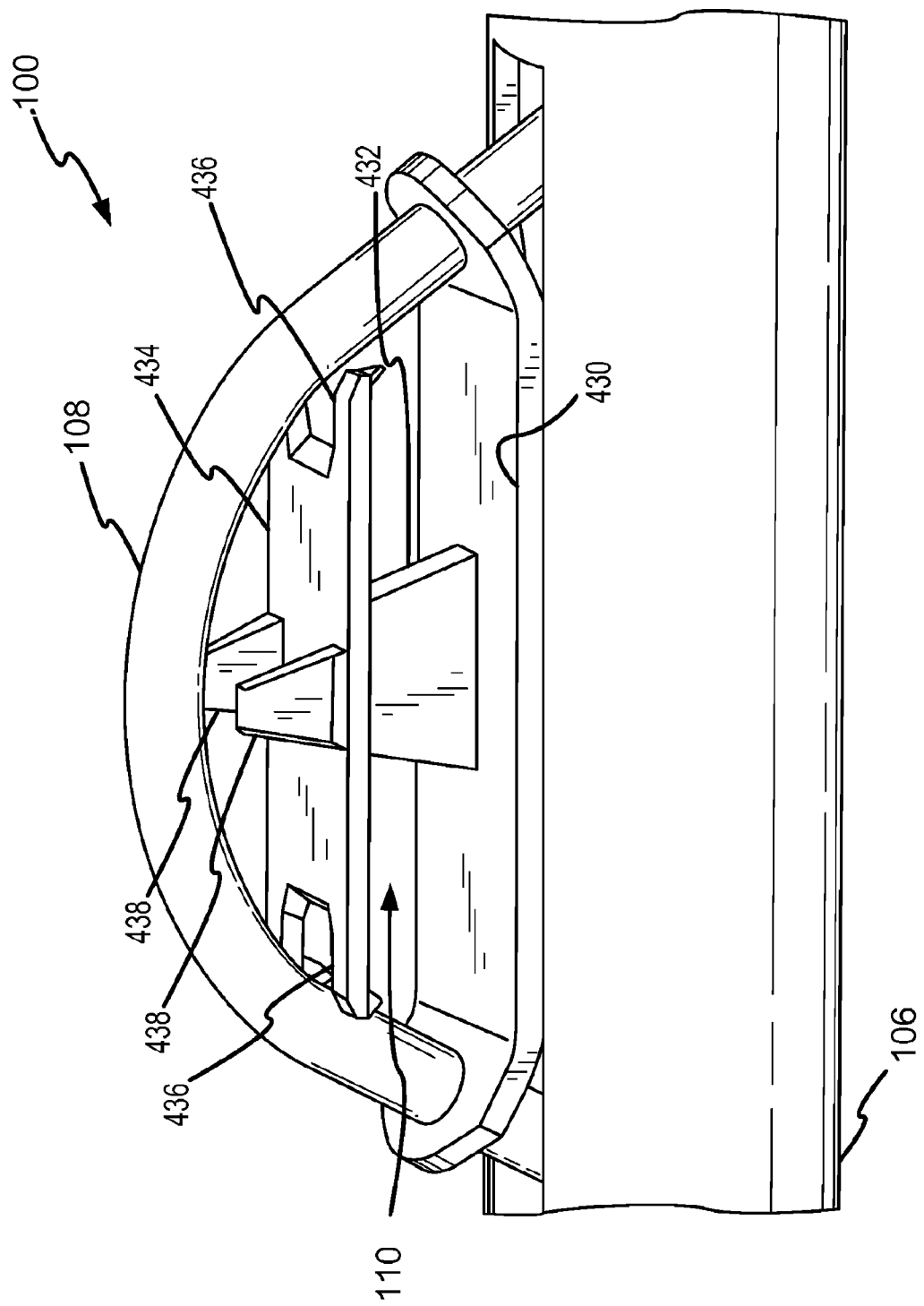
FIG. 4 is an isometric view of a section of a Coriolis flow meter 400 in an example embodiment of the invention.

FIG. 4 is an isometric view of a section of a Coriolis flow meter 100 in an example embodiment of the invention. Coriolis flow meter 100 comprises manifold spacer 106, flow tube 108, and balance structure 110. Balance structure 110 comprises torsion member 430, balance member 432, pickoff support member 434, and drive brackets 438. Balance structure 110 and flow tube 108 act as a dynamic system that behave as a free-free two body spring mass system.

Each end of torsion member 430 is attached to flow tube 108. The ends may be attached by brazing, welding, gluing, clamping or the like. In one example embodiment of the invention, the ends of torsion member 430 attach to the flow tube 108 near where the flow tube 408 extends above the outer surface of manifold spacer 106. Torsion member 430 is a generally flat plate with the two ends tilted upward such that the two ends are perpendicular to the flow tube at the two places where the torsion member 430 attaches to the flow tube 108. Torsion member 430 has a top side and a bottom side. The top side is facing the curved vertex section of the flow tube 108. The bottom side is facing manifold spacer 106. A first vibration node (i.e. an axis of zero motion) extends along the length of the torsion member intersecting the flow tube axis of symmetry near where the torsion member attaches to the flow tube. The first vibration node may also be called the torsional vibration node or a torsional vibration axis. Torsion member is shown as a generally flat plate but may take other shapes, for example a tube, a square rod, or the like.

Balance member 432 is attached to the top side of torsion member 430 and is centered between the two ends of torsion member 430. Balance member 432 is essentially a flat plate formed in one plane. Balance member 432 is perpendicular to the top side of torsion member 430. The plane defined by balance member 432 is aligned with the first vibration node. Balance member 432 is shown as a trapezoid in FIG. 4, but may be other shapes, for example a rectangle or the like. Balance member 432 is configured to have a high bending stiffness in-and-out of the plane defined by the single flow tube.

In one example embodiment of the invention, pickoff support member 434 is attached to the top of balance member 432. Pickoff support member is generally a flat plate formed in one plane with a pickoff bracket 436 at each end. Pickoff support member 434 is perpendicular to balance member 432. Pickoff support member is centered, from side-to-side, and front-to-back, on balance member 432. Pickoff brackets 436 on each end of pickoff support member 434 are configured to mount sensors (not shown) that measure the relative position or velocity between the pickoff brackets and the flow tube. Any type of sensor may be used, for example a magnet and coil pair, an optical sensor, or the like. In one example embodiment of the invention a magnet is attached to the flow tube and a coil is attached to the pickoff bracket. Pickoff support member 434 is configured as a low mass high stiffness structure, such that the natural frequency of any vibration modes in pickoff support member are well away from the drive frequency of the tube/balance structure. This separation of natural frequencies minimizes any coupling between the drive frequency and other modes of vibration. In another embodiment of the invention (not shown) the pickoff sensors would not be mounted on the balance structure. The pickoff sensors would be mounted to other parts of the Coriolis flow meter, for example the manifold spacer.

In one example embodiment of the invention, drive brackets 438 are attached to the top of pickoff support member 434. Drive brackets 438 are configured to mount a drive system (not shown) that is used to apply a force between the balance structure and the flow tube. The force is typically applied to the flow tube at the axis of symmetry of the tube at the center of the curved section of the flow tube. In one example embodiment of the invention (not shown), there is only one drive bracket mounted to pickoff support member. In another embodiment of the invention (not shown), drive brackets may be mounted directly onto balance member.

Figure 5:
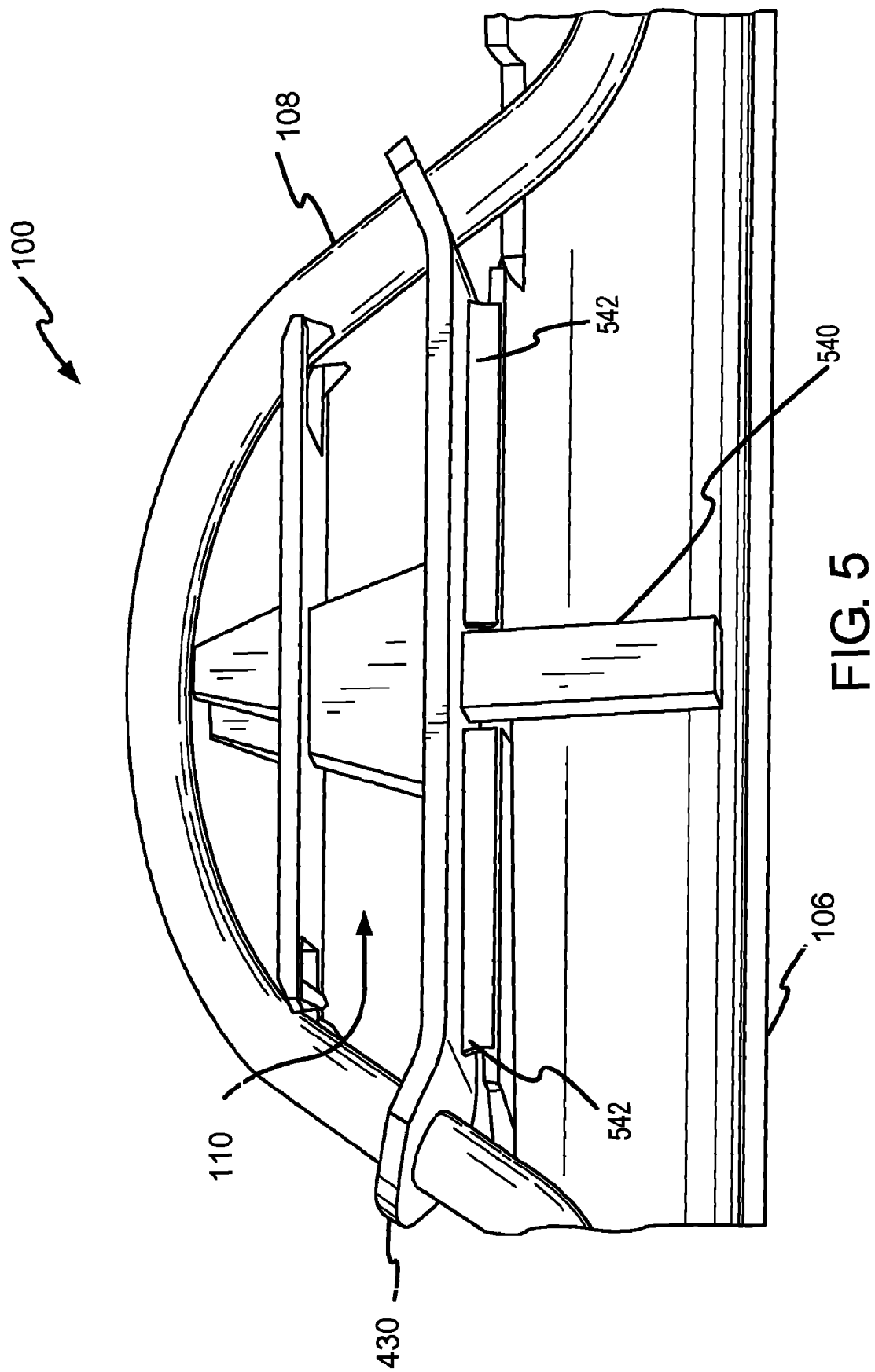
FIG. 5 is a partial isometric cross-sectional view of Coriolis flow meter 500 in an example embodiment of the invention.

FIG. 5 is a partial isometric cross-sectional view of Coriolis flow meter 100 in an example embodiment of the invention. Coriolis flow meter 100 comprises manifold spacer 106, flow tube 108, and balance structure 110. A cross sectional view of manifold spacer 106 is shown to expose dongle 540 and hinge 542. As described in FIG. 4, torsion member 430 is attached to flow tube 108. Dongle 540 is attached to the bottom side of torsion member 430 and extends down into the interior of manifold spacer 106 through an opening in manifold spacer 106. In one example embodiment of the invention, dongle is a generally rectangular flat plate with the long axis perpendicular to the bottom surface of torsion member 430. Dongle 540 may take other shapes, for example a shorter length with a mass attached at the tip of the dongle. Dongle 540 is centered on and symmetrical about the axis of symmetry of flow tube 108 that intersects the center of the curved vertex section of flow tube 108. Hinge 542 is a thin member that couples the bottom surface of torsion member 430 to the top surface of manifold spacer 106. Hinge is typically formed in two parts, one on either side of the dongle opening in manifold spacer 106. Hinge 542 forms a plane that is aligned with the first or torsional vibration node in torsion member 430. Because hinge 542 is aligned with the torsional vibration node, the hinge has little or no effect in raising the frequency of the flow tube and balance structure. Hinge 542 may also be called a flexible member.

Figure 6A:
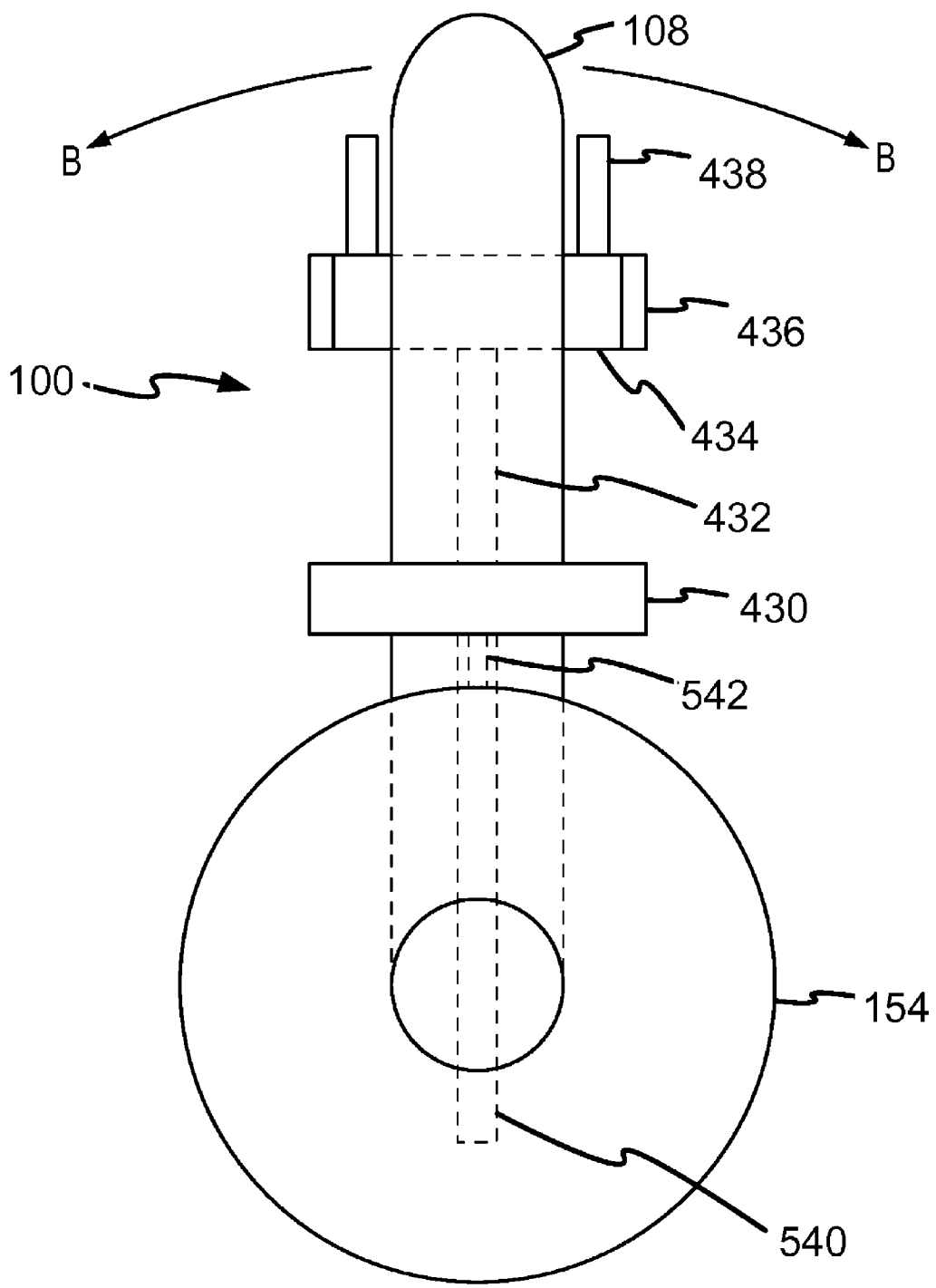
FIG. 6a is simplified end view of Coriolis flow meter 600 in a non-deflected state in an example embodiment of the invention
Figure 6B:
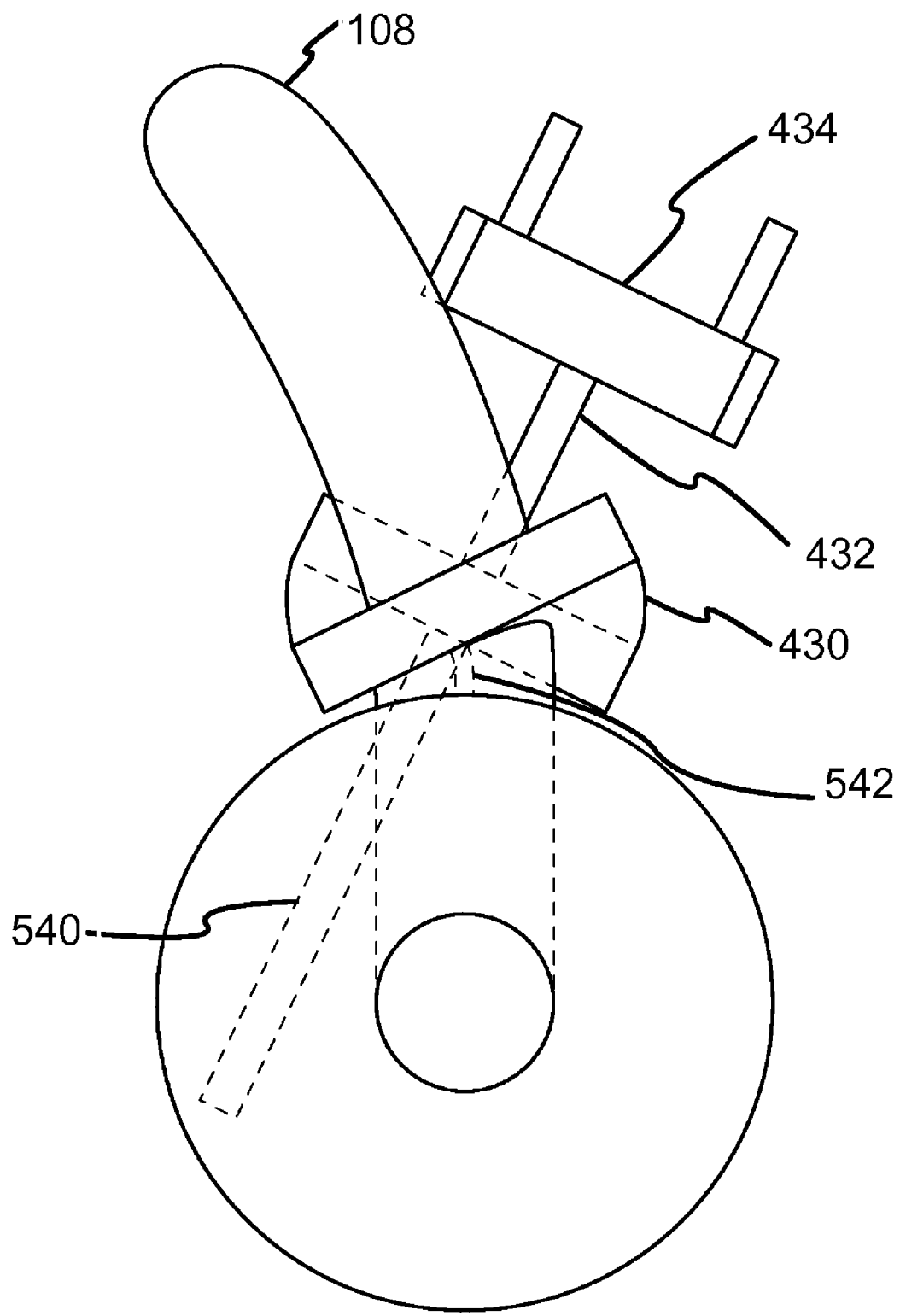
FIG. 6b is simplified end view of Coriolis flow meter 600 at an exaggerated peek displacement during vibration, in an example embodiment of the invention

FIGS. 6a and 6b are simplified end views of Coriolis flow meter 100 in an example embodiment of the invention. Coriolis flow meter 100 comprises manifold 154, flow tube 108, and balance structure comprising flexible member 542, torsion member 430, balance member 432, pickoff support member 434, pickoff bracket 436, drive bracket 438 and dongle 540. Some parts of Coriolis flow meter 100 have been simplified for clarity in describing the operation of the flow meter, for example torsion member 430 is shown as one flat plate and not shown as having the ends tilted upward. FIG. 6a shows the flow tube and balance structure at rest or in a non-displaced position. In operation, a driver (not shown) attached to the drive brackets would cause the flow tube to vibrate along arrows BB. The balance structure would vibrate at the same frequency but in the opposite phase.

FIG. 6b is an end view of Coriolis flow meter 100 at an exaggerated peak displacement during vibration, in an example embodiment of the invention. Flow tube 108 has rotated counter-clockwise and the balance member 432, pickoff support member 434 and dongle 540 have rotated clockwise to balance the movement of flow tube 108. Torsion member 430 has been deformed in torsion with the end sections of torsion member 430 moving in unison with flow tube 108 and with the middle section of the torsion member 430 moving in unison with balance member 432, dongle 540 and pickoff support member 434. The torsional axis of rotation is essentially along the intersection of flexible member 542 with torsion member 430.

Figure 7A:
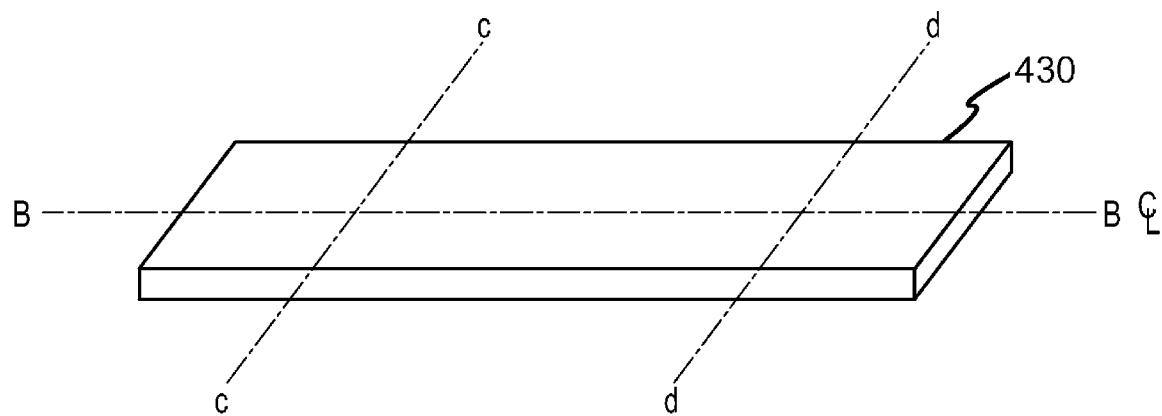
FIG. 7a is a simplified isometric view of torsion member 730 in an un-deflected state in an example embodiment of the invention
Figure 7B:
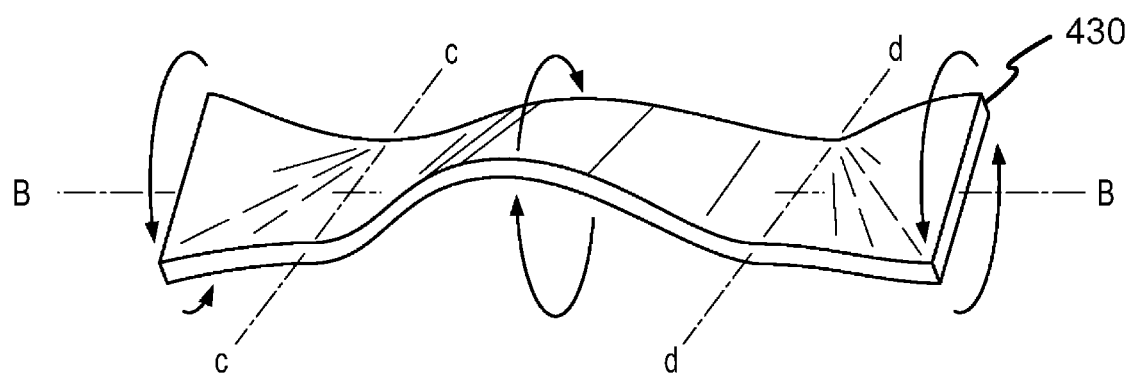
FIG. 7b is a simplified isometric view of torsion member 730 in a deflected state in an example embodiment of the invention.

FIGS. 7a and 7b are simplified isometric views of torsion member 430 in an example embodiment of the invention. Torsion member 430 has been simplified by showing it as a flat plate without the ends tilted upwards. FIG. 7a shows torsion member 430 in an un-deflected state. During operation of the flow meter, the flow tube and the balance member vibrate at the same frequency but in the opposite phase, causing the flow tube and balance member to always move in opposite directions. FIG. 7b shows torsion member in one of the shapes taken during vibration of the flow tube and balance structure. The two ends of torsion member 430 that are attached to the flow tube (not shown) have been twisted or rotated about axis BB in a counter-clockwise direction, following the movement of the flow tube. The middle or center section of torsion member 430, attached to the balancing structure (not shown), has been twisted or rotated about axis BB in the opposite or clockwise direction, following the motion of the balance structure. At the opposite vibration position of the flow tube and the balance structure (not shown), the two ends of torsion member would be torsionally deflected in a clockwise direction about axis BB and the middle section of torsion member 430 would be torsionally deflected in the opposite or counter-clockwise direction about axis BB.

Axis CC and axis DD represent the location of two vibration nodes or vibration axes formed in torsion member 430. Every part of torsion member 430 between axis CC and axis DD rotates with the balance structure about axis BB. Every part of torsion member 430 to the left of axis CC and to the right of axis DD rotates about axis BB along with the flow tube. The position or location of axis CC and axis DD can change in response to a change in density in the material flowing through the flow tube. When the density of the material flowing through the flow tube increases, causing the mass of the vibrating tube to increase, the two vibration nodes shift away from each other. When the density of the material flowing through the flow tube decreases, decreasing the mass of the vibrating tube, the two vibration nodes move towards each other. The vibration amplitude of the flow tube divided by the vibration amplitude of the balance structure will be called the amplitude ratio. The amplitude ratio also changes with a change in the density of the material flowing through the flow tube. As the fluid density increases, the amplitude ratio decreases.

Figure 8:
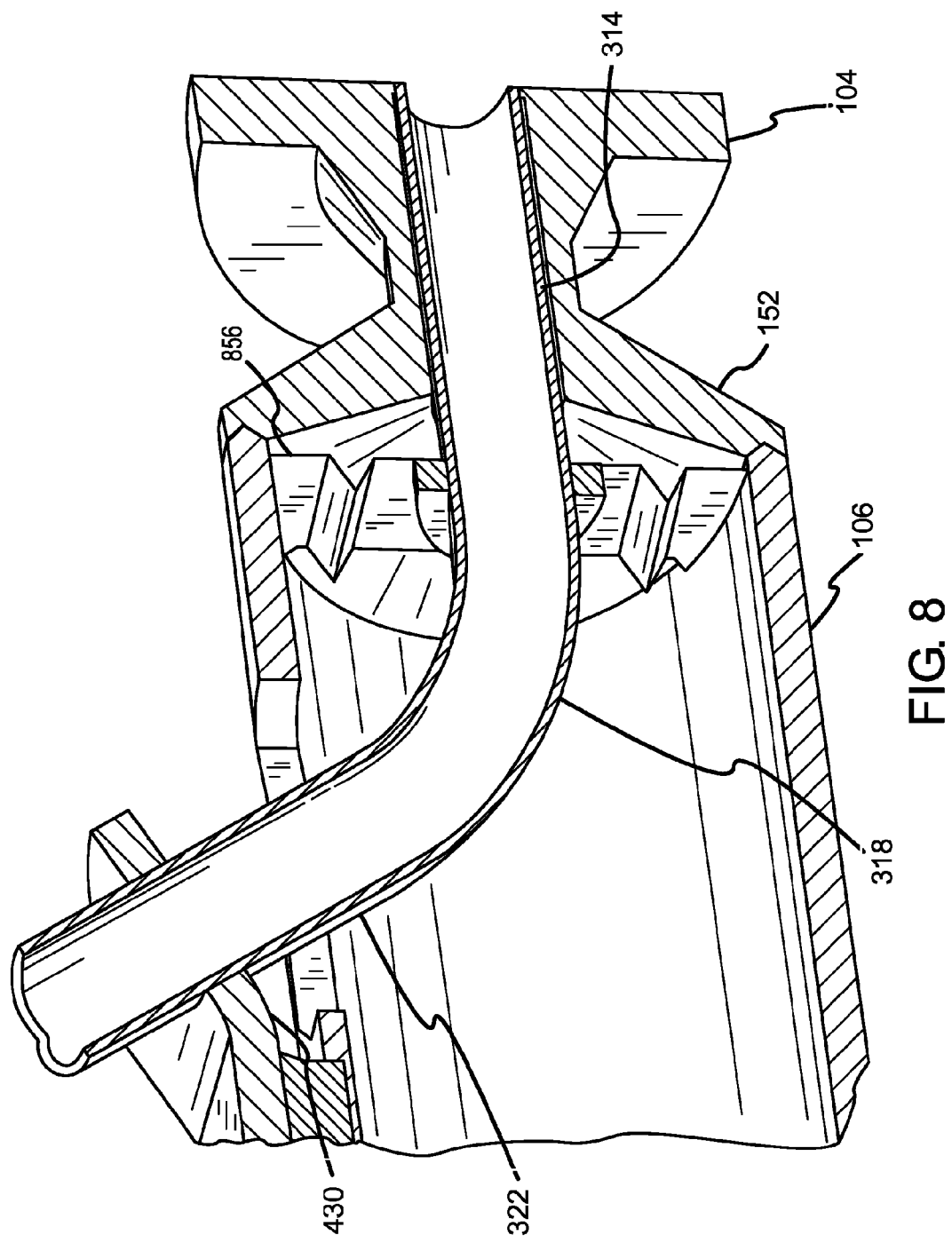
FIG. 8 is a cross-sectional view of one end of a Coriolis flow meter in an example embodiment of the invention

FIG. 8 is a cross-sectional view of one end of a Coriolis flow meter in an example embodiment of the invention. FIG. 8 comprises outlet manifold 152, outlet flange 104, manifold spacer 106, outlet section 314 of flow tube, second bent section 318 of flow tube, second straight section 322 of flow tube, and torsion member 430. Outlet manifold 152 is installed in the end of manifold spacer 106. The outlet section of flow tube 314 is installed into outlet flange 104. In this embodiment flow tube passes through manifold 152 without touching it. Instead, the end of the flow tube 314 is attached to flange 804. To prevent movement of the tube in the direction of vibration, the tube is attached to case connect link 856. Second bent section 318 of flow tube is unsupported. Torsion member 430 is coupled to the second straight section of the flow tube near where the flow tube exits from the manifold spacer 106. First bent section (not shown) of flow tube is also unsupported.

The balance structure and flow tube of the current invention act as a dynamic system that behave as a free-free two body spring mass system. The system is self-balancing in that without any external forces, the momentum of the system will sum to zero. The system will self balance with changes in the density of the material flowing through the flow meter. The self-balancing will automatically be achieved by a shift in the amplitude ratio whereby the flow tube amplitude decreases and the balance structure amplitude increases as the fluid density increases. In addition to the change in the amplitude ratio, there will be a corresponding shift in the position of the two vibration nodes that divide the torsion member into the part that moves with the balance structure and the parts that moves with the flow tube. The natural vibration frequency, or drive frequency, of the tube and balance structure are well above the natural vibration frequency of the other structures in the flow meter. The large frequency separation between the other structural frequencies and the flow tube/balance structure frequencies allows the flow tube/balance structure to behave as a free-free two body system. The two bent sections of the flow tube are left unsupported (as shown in FIG. 8) to provided a soft connection to the manifold. By using a soft connection between the flow tube/balance structure and the manifold, the dynamic structure of the flow tube/balance structure is free to act as a free-free two body system.

The stiffness of the flow tubes and balance structure are adjusted such that the natural frequency of the out-of-phase vibration of the tube and balance structure is much higher than the in-phase natural frequency. This minimizes the coupling between the two modes of vibration of the flow tubes and balance structure. In one example embodiment of the invention, the in-phase natural frequency is at 247 Hz and the out-of-phase natural frequency is at 408 Hz. The design of the flow meter is also configured to set the natural frequency of other vibration mode to at least 100 Hz away from the drive frequency.

The dongle is used to counter balance the motion of the bent section (316 and 318) of the flow tube outside of the dynamic structure of the flow tube/balance structure. The dongles length, shape and mass are adjusted to eliminate any residual motion in the flanges (102 and 104).

I claim:

1. A Coriolis flow meter, comprising:
    a single flow tube comprising;
        an inlet section (312) and an outlet section (314) where the inlet section (312) and outlet sections (314) are axially aligned;
        a first bent section (316) attached to the inlet section (312) and a second bent section (318) attached to the outlet section (314);
        a connecting section (324) extending between the first bent section (316) and the second bent section (318) where the single flow tube is symmetrical about an axis of symmetry that intersects a center of the connecting section (324) and where the single flow tube is formed essentially in one plane;
        a torsion member (430) having a center section, a first end, and a second end where the first end is attached to the connecting section (324) of the single flow tube near the first bent section (316) and the second end is attached to the connecting section (324) of the single flow tube near the second bent section (318);
        a balance member (432) attached to the torsion member (430) and extending towards the center of the connecting section of the single flow tube and where the balance member (432) is generally perpendicular to the torsion member (430); and
        at least one drive bracket (438) attached to the balance member (432) where the at least one drive bracket (438) is configured to mount a drive device where the drive device is configured to apply a force against the single flow tube;
    wherein the first end and the second end of the torsion member (430) is configured to vibrate in-phase with the single flow tube and the center section of the torsion member (430) is configured to vibrate in the opposite phase with respect to the single flow tube thereby causing the torsion member to deform in torsion along a torsional vibration axis.

2. The Coriolis flow meter of claim 1 further comprising:
    a first manifold (154) coupled to the inlet section (312) of the single flow tube and a second manifold (152) coupled to the outlet section (314) of the single flow tube;
    a manifold spacer (106) extending between the first and second manifold (152, 154), the manifold spacer (106) having an outer surface, the manifold spacer (106) having a first opening through the outer surface near the first manifold (154) and a second opening through the outer surface near the second manifold (152) where a first end of the connecting section of the single flow tube extends through the first opening and a second end of the connecting section of the single flow tube extends through the second opening; and
    a flexible member (542) aligned with the torsional vibration axis and coupled to the outer surface of the manifold spacer and coupled to the center section of the torsion member.

3. The Coriolis flow meter of claim 2 where the manifold spacer (106) encloses the inlet section (312) and the outlet section (314) of the single flow tube and the first bent section (316) and the second bent section (318) of the single flow tube.

4. The Coriolis flow meter of claim 2 where the manifold spacer (106) is essentially cylindrical.

5. The Coriolis flow meter of claim 2 further comprising:
    a dongle (540) attached to the torsion member (430) where the dongle (540) is perpendicular to the torsion member (430) and extends downward from the torsion member (430), away from the single flow tube, and is aligned with the axis of symmetry of the single flow tube and where the dongle (540) is configured to eliminate any residual motion in the first and second manifolds.

6. The Coriolis flow meter of claim 5 where the dongle (540) is a flat plate with a generally rectangular shape with a long axis of the rectangular shape perpendicular to the torsion member (430).

7. The Coriolis flow meter of claim 1 where the torsional vibration axis is in the plane defined by the single flow tube.

8. The Coriolis flow meter of claim 1 further comprising:
    a pickoff support member (434) attached to the balance member (432) where the pickoff support member (434) is parallel with the torsion member (430) and extends between two segments of the connecting section (324) of the single flow tube on opposite sides of the axis of symmetry of the single flow tube and where the pickoff support member (434) is configured to hold a first sensor device at a first end of the pickoff support member (434) and a second sensor device at a second end of the pickoff support member.

9. The Coriolis flow meter of claim 1 where the torsion member (430) is a generally flat plate parallel to the torsional vibration axis and where the first end of the torsion member is bent such that the first end is perpendicular to the connecting section of the single flow tube where the first end of the torsion member is coupled to the connecting section of the single flow tube and the second end of the torsion member is bent such that the second end is perpendicular to the connecting section of the single flow tube where the second end of the torsion member is coupled to the connecting section of the single flow tube.

10. The Coriolis flow meter of claim 1 where the connecting section of the single flow tube further comprises:
    a first straight section (320) attached to the first bent section (316) and a second straight section (322) attached to the second bent section (318) of the single flow tube; and
    a curved vertex section attached to, and extending between, the first straight section and the second straight section.

11. The Coriolis flow meter of claim 1 where the balance member (432) of the single flow tube is a generally flat plate having a trapezoidal shape with the wide end of the trapezoid attached to the torsion member (430) along the torsional vibration axis.

12. The Coriolis flow meter of claim 1 where the balance member (432) is configured to have a high bending stiffness along the axis of symmetry of the single flow tube.

13. The Coriolis flow meter of claim 1 where a stiffness of the single flow tube 108 and a stiffness of the torsion member (430) and balance member (432) are adjusted such that the natural frequency of the out-of-phase vibration of the flow tube and torsion member and balance member is much higher than the in-phase natural frequency.

14. A method of operating a Coriolis flow meter having a single curved flow tube, comprising:
suspending the single curved flow tube (108) between two ends of the Coriolis flow meter where two bent sections of the single curved flow tube (108) are unsupported and where the two bent section are on opposite sides of an axis of symmetry of the single curved flow tube;
attaching two ends of a torsion member (430) to the single curved flow tube (108) at two points placed symmetrically about the axis of symmetry of the single curved flow tube (108) and closer to the axis of symmetry than the two bent sections of the single curved flow tube; and
generating a force between the single curved flow tube (108) and a balance member (432) such that the balance member (432) and the single curved flow tube (108) vibrate at the same frequency but in the opposite phase and where the balance member (432) is attached to a center section of the torsion member (430) whereby the center section of the torsion member (430) deflects in torsion, along a torsional axis of rotation, in-phase with the balance structure and the two ends of the torsion member deflect in torsion, along the torsional axis of rotation, in-phase with the single curved flow tube (108).

15. The method of claim 14 where the torsion member (430) is attached to a manifold spacer (106) with a flexible member (542) and where the flexible member (542) is aligned to the torsional axis of rotation.

16. The method of claim 14 where the Coriolis flow meter also comprises a first manifold coupled to an inlet section of the single flow tube and a second manifold coupled to an outlet section of the single flow tube and a manifold spacer extending between the first and second manifolds; and
a dongle (540) is attached to the torsion member (430) opposite the balance member (432) and configured to eliminate any residual motion in the two manifolds.

17. The method of claim 14, further comprising:
flowing a material having a first density through the vibrating single curved flow tube.

18. The method of claim 17 further comprising:
flowing a material having a second density through the single curved flow tube (108) where the first density is different than the second density and where the first vibration axis is no longer formed at the first location and the second vibration axis is no longer formed at the second location.

19. A method of manufacturing a Coriolis flow, comprising:
providing a single flow tube, the single flow tube comprising;
an inlet section (312) and an outlet section (314) where the inlet section (312) and outlet sections (314) are axially aligned;
a first bent section (316) attached to the inlet section (312) and a second bent section (318) attached to the outlet section (314);
a connecting section (324) extending between the first bent section (316) and the second bent section (318) where the single flow tube is symmetrical about an axis of symmetry that intersects a center of the connecting section (324) and where the single flow tube is formed essentially in one plane;
attaching a first end of a torsion member (430) to the connecting section of the single flow tube near the first bent section (316) and attaching a second end of the torsion member (430) to the connecting section of the single flow tube near the second bent section (318), the torsion member (430) also having a center section;
attaching a balance member (432) to a first side of the torsion member (430) where the balance member (432) extends towards the center of the connecting section of the single flow tube and where the balance member (432) is oriented in the plane of the flow tube; and
attaching at least one drive bracket (438) to the balance member (432) where the at least one drive bracket (438) is configured to mount a drive device where the drive device is configured to apply a force against the single flow tube;
where the first end and the second end of the torsion member (430) are configured to vibrate in-phase with the single flow tube and the center section of the torsion member (430) is configured to vibrate in the opposite phase with respect to the single flow tube thereby causing the torsion member to deform in torsion along a torsional vibration axis.

20. The method of manufacturing a Coriolis flow meter of claim 19 further comprising:
coupling a first manifold (154) to the inlet section (312) of the single flow tube and a second manifold (152) to the outlet section (314) of the single flow tube;
attaching a manifold spacer (106) between the first and second manifolds (154, 152), the manifold spacer (106) having an outer surface, the manifold spacer having a first opening through the outer surface near the first manifold (154) and a second opening through the outer surface near the second manifold (152) where a first end of the connecting section of the single flow tube extends through the first opening and a second end of the connecting section of the single flow tube extends through the second opening; and
attaching a flexible member (542) to the outer surface of the manifold spacer (106) and to the torsion member where the flexible member is aligned with the torsional vibration axis.

21. The method of manufacturing a Coriolis flow meter of claim 20 where the manifold spacer (106) encloses the inlet section (312) and the outlet section (314) of the single flow tube and the first bent section (316) and the second bent section (318) of the single flow tube.

22. The method of manufacturing a Coriolis flow meter of claim 20 where the manifold spacer (106) is essentially cylindrical.

23. The method of manufacturing a Coriolis flow meter of claim 20 further comprising:
attaching a dongle (540) to the torsion member (430) where the dongle (540) is perpendicular to the torsion member (430) and extends downward from the torsion member (430), away from the balance member (432), and is aligned in the plane of the single flow tube and where the dongle (540) is configured to eliminate any residual motion in the first and second manifolds.

24. The method of manufacturing a Coriolis flow meter of claim 23 where the dongle (540) is a flat plate with a generally rectangular shape with a long axis of the rectangular shape perpendicular to the torsion member.

25. The method of manufacturing a Coriolis flow meter of claim 19 where the torsional vibration axis runs between the connecting section of the single flow tube near the first bent section and the connecting section of the single flow tube near the second bent section along a length of the center section of the torsion member.

26. The method of manufacturing a Coriolis flow meter of claim 19 further comprising:

attaching a pickoff support member (434) to the balance member (432) where the pickoff support member (434) is parallel with the torsion member (430) and extends between two segments of the connecting section of the single flow tube on opposite sides of the axis of symmetry of the single flow tube and where the pickoff support member is configured to hold a first sensor device at a first end of the pickoff support member and a second sensor device at a second end of the pickoff support member.

27. The method of manufacturing a Coriolis flow meter of claim 19 where the torsion member (430) is a generally flat plate parallel to the torsional vibration axis and where the first end of the torsion member (430) is bent such that the first end is perpendicular to the connecting section of the single flow tube where the first end of the torsion member (430) is coupled to the connecting section of the single flow tube and the second end of the torsion member (430) is bent such that the second end is perpendicular to the connecting section of the single flow tube where the second end of the torsion member (430) is coupled to the connecting section of the single flow tube.

28. The method of manufacturing a Coriolis flow meter of claim 19 where the connecting section of the single flow tube further comprises:

a first straight section (320) attached to the first bent section (316) and a second straight section (322) attached to the second bent section (318) of the single flow tube; and a curved vertex section attached to, and extending between, the first straight section and the second straight section.

29. The method of manufacturing a Coriolis flow meter of claim 19 where the balance member (432) of the single flow tube is a generally flat plate having a trapezoidal shape with the wide end of the trapezoid attached to the torsion member (430) along the torsional vibration axis.

30. The method of manufacturing a Coriolis flow meter of claim 19 where the balance member (430) is configured to have a high bending stiffness along the axis of symmetry of the single flow tube.

31. The method of manufacturing a Coriolis flow meter of claim 19 where a stiffness of the single flow tube and a stiffness of the torsion member (430) and balance member (432) are adjusted such that the natural frequency of the out-of-phase vibration of the single flow tube and torsion member and balance member is much higher than the in-phase natural frequency.

* * * * *